United States Patent [19]

Paek

[11] Patent Number: 5,121,228
[45] Date of Patent: Jun. 9, 1992

[54] HOLOGRAPHIC LEARNING MACHINE

[75] Inventor: Eung-Gi Paek, Freehold, N.J.

[73] Assignee: Bell Communications Research, Livingston, N.J.

[21] Appl. No.: 588,710

[22] Filed: Sep. 27, 1990

[51] Int. Cl.$^5$ .................. G02B 27/46; G06G 9/00
[52] U.S. Cl. ........................ 359/7; 359/21; 359/561; 364/822
[58] Field of Search ............. 350/3.64, 162.12, 3.74; 364/807, 822

[56] References Cited

U.S. PATENT DOCUMENTS

| | | | |
|---|---|---|---|
| 4,804,250 | 2/1989 | Johnson | 350/162.12 |
| 4,826,285 | 5/1989 | Horner | 364/822 |
| 4,963,725 | 10/1990 | Hong et al. | 350/163 |
| 4,988,153 | 1/1991 | Paek | 350/3.8 |

OTHER PUBLICATIONS

D. Psaltis et al, "Adaptive optical networks using photorefractive crystals," *Applied Optics*, May 1988, vol. 27, pp. 1752-1759.

Hong et al, "Trainable Optical Network for Pattern Recognition," *Optical Computing: 1989 Technical Digest Series*, 1989, vol. 9, Postconference Edition, Salt Lake City, Utah, pp. 307-310.

J. H. Hong et al, "Optical pattern classifier with Perceptron learning," *Applied Optics*, Jul. 1990, vol. 29, No. 20, pp. 3019-3025.

J. H. Hong et al, "Adaptive Optical Pattern Classifier," *Conference Record of 1990 International Topical Meeting on Optical Computing*, 1990, Kobe, Japan, pp. 266-267.

H. Yoshinaga et al, "Experimental learning in an optical perceptronlike neural network," *Optics Letters*, Jul. 1989, vol. 14, No. 14, pp. 716-718.

E. G. Paek et al, "Holographic implementation of a learning machine based on a multicategory perceptron algorithm," *Optics Letters*, Dec. 1989, vol. 14, No. 23, pp. 1303-1305.

E. G. Paek et al, "Optical learning machine for multi-category classification," *Optics News*, Dec. 1989, p. 28.

W. P. Bleha et al, "Application of the Liquid Crystal Light Valve to Real-Time Optical Data Processing," 1978, *Optical Engineering*, Jul.-Aug. 1978, vol. 17, No. 4, pp. 371-384.

M. Schadt et al, "Voltage-dependent optical activity of a twisted nematic liquid crystal," *Applied Physics Letters*, Feb. 1971, vol. 18, No. 4, pp. 127-128.

J. J. Amodei et al, "Improved Electrooptic Materials and Fixing Techniques for Holographic Recording," *Applied Optics*, Feb. 1972, vol. 11, No. 2, pp. 390-396.

F. Micheron et al, "Electrical Control in Photoferroelectric Materials for Optical Storage," *Applied Optics*, Apr. 1974, vol. 13, No. 4, pp. 784-787.

E. G. Paek et al, "Holographic On-Line Learning Machine for Multicategory Classification," *Japanese Journal of Applied Physics*, Jul. 1990, vol. 29, No. 7, pp. L1332-L1334.

*Primary Examiner*—Bruce Y. Arnold
*Assistant Examiner*—Martin Lerner
*Attorney, Agent, or Firm*—Leonard Charles Suchyta; Charles S. Guenzer

[57] ABSTRACT

A holographic learning machine comprising a volume holographic recording medium, 2N photo-detectors receiving light diffracted from the medium, and N electrical circuits subtracting respective pairs of outputs of the photo-detectors, thresholding the differences and comparing them to target values. During training, a coherent image beam shines on the recording medium and corresponding target values are supplied to the circuits. Depending on whether the comparison between the thresholded difference and the target is positive or negative, a positive error or negative error amplitude modulator in a 2N array is turned on to transmit to the recording medium light coherent with the image beam. Thereby, the full bipolar perceptron algorithm is implemented. The implementation may be integrated into a rugged, integral unit.

11 Claims, 5 Drawing Sheets

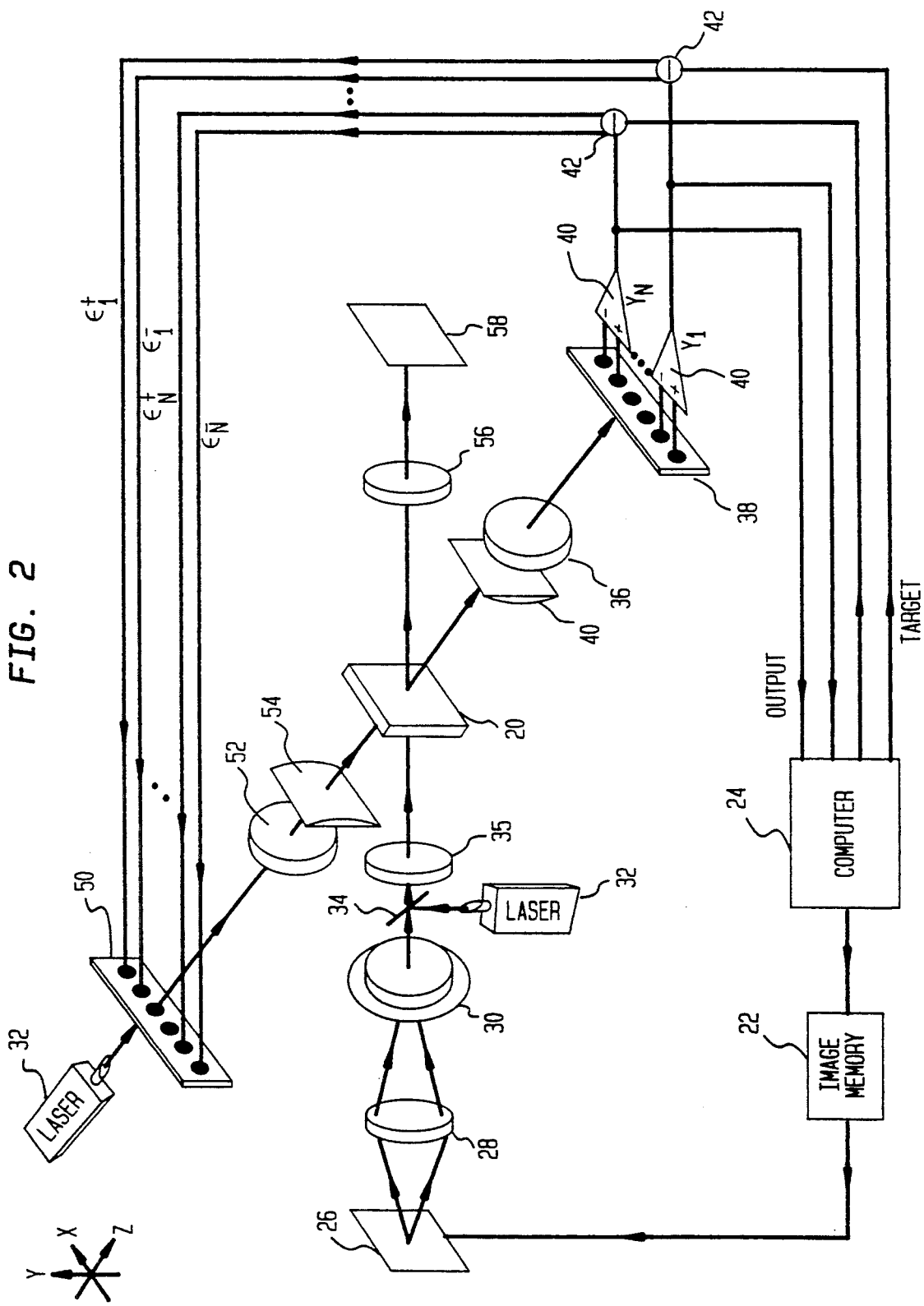

HOLOGRAPHIC LEARNING MACHINE

GOVERNMENT RIGHTS

This invention was made partially with Government support under Contract DAAL01-89-C-0900 awarded by the Department of the Army. The Government has certain rights in this invention.

FIELD OF THE INVENTION

The invention relates in general to neural learning machines and in particular to holographic learning machines.

BACKGROUND ART

Most present day digital computers are controlled by a program to process data according to a comprehensive set of rules incorporated into the program. However, in many situations, such a rule-based system does not work well. The rules for image recognition, an example of a much larger problem class, are complex and not really well known in strictly logical terms. Furthermore, image recognition does not inherently require the precision available in a digital computer. Recognition of a single image requires only a single-bit yes/no answer. A multi-category classification requires a limited range of decisions, for example, 10 possible answers for an Arabic-number reader.

To overcome the above limitations of a digital computer, many research groups have suggested learning and recognition systems based on associative memories, which are reminiscent of human memory and its learning process. In broad terms, these systems are taught by presenting to them sample input patterns, e.g., images, while simultaneously forcing their output to the correct answer. By various means, the internal connections of the learning system are readjusted during the simultaneous setting of its input and output. After completion of learning, the system, when presented with a learned input pattern, will produce the learned output. The system becomes advantageous when it can recognize a pattern that differs somewhat from the learned pattern.

Apart from computer simulations, most learning machines that have actually been fabricated are electronic in nature and are often referred to as neural networks. However, it is difficult to implement neural networks of a practical size because of the complexity of the interconnections within the system.

Several groups have suggested optical learning machines based on holographic memories. Psaltis et al. provide a review of the theory of holographic learning machines in "Adaptive optical networks using photorefractive crystals," *Applied Optics*, volume 27, 1988, pages 1752-1759. However, they described an implementation that could learn only a single pattern and could be extended to multiple category classification only with much difficulty.

Hong et al. have proposed a modification of the Psaltis machine in "Trainable Optical Network for Pattern Recognition," *Optical Computing:* 1989 *Technical Digest Series*, Volume 9, Postconference Edition, Salt Lake City, Utah, 1989, pages 307-310, and in "Optical pattern classifier with Perceptron learning," *Applied Optics*, volume 29, 1990, pages 3019-3025. They proposed a form of bipolar learning, that is, positive feedback for a correct output and negative feedback for incorrect outputs, by shutters selectively blocking two beams producing anti-phase beams. The proposals of both Psaltis et al. and Hong et al. amount to incomplete implementations of the perceptron algorithm in which the interconnection matrix is bipolar, but they lose the polarity of the output of the interconnection matrix, which is important in making a decision. Furthermore, although they suggested ways to achieve multicategory classification using spatial multiplexing of the reference beam, their design appears unwieldy. Hong et al. have described the actual operation of this learning machine for single-category classification in a later article, "Adaptive Optical Pattern Classifier," *Conference Record of* 1990 *International Topical Meeting on Optical Computing*, Kobe, Japan, 1990, pages 266-267.

Another optical learning machine has been disclosed by Yoshinaga et al. in "Experimental learning in an optical perceptronlike neural network," *Optics Letters*, volume 14, 1989, pages 716-718. Only a single alignment of image and reference beams and only a single optical detector were used. Therefore, their system was only capable of single-category classification. Furthermore, the interconnection matrix and the output signal were necessarily unipolar and the perceptron algorithm was only partially implemented.

The optical learning machines described above must be viewed as experimental designs. Many improvements and fundamentally different designs are needed before optical learning machines can be commercialized. Multi-category classification is needed for most applications. All the prior art apparatus are assumed to all have been implemented on an optical table of large dimension using discrete optical devices with precise alignment required. Commercial devices need to be small, easily aligned, and relatively rugged.

Prior-art holographic learning machines had a further problem arising from their relatively low learning efficiency. Typical holographic media used in learning machines use photorefractive crystals which are not permanently recorded but decay over time to the unrecorded state. To compensate, the prior-art machines used high laser recording intensities which recorded the memory crystal close to its saturation level. Although the crystal was recorded fairly quickly to within a few percent of its saturation, a very large laser intensity was required for saturation. Conversely, the saturated recording quickly decayed to a few percent of its saturated value, after which it more slowly decayed. As a result, the crystal was decaying nearly as fast as it could be recorded, thus limiting the number of classes with which it could be taught.

SUMMARY OF THE INVENTION

Accordingly, an object of the invention is to provide a multi-category learning machine.

Another object of the invention is to provide a rugged learning machine.

The invention can be summarized as a holographic learning and recognition system, capable of exactly implementing the perceptron algorithm. The system is based on a holographic memory system having an array of optical modulators selectively passing the reference beam to the photorefractive crystal. The modulators in the array are paired to receive respective positive and negative feedback signals from a pair of optical detectors in an array receiving light diffracted from the partially recorded photorefractive crystal. The electrical outputs of the pair of detectors are differenced, thresholded, and compared to a target value for the image being learned. Depending on the comparison, either a positive or negative feedback signal is supplied. Once the patterns have been learned, the difference of the positive and negative detectors provides the recognition signal.

BRIEF DESCRIPTION OF THE DRAWINGS

FIG. 2 is a perspective view, partially in block diagram form, illustrating a first embodiment of the invention.

DETAILED DESCRIPTION OF THE PREFERRED EMBODIMENTS

The two described embodiments of the invention use the well known perceptron algorithm in a holographic learning machine. The perceptron algorithm will be briefly described to facilitate an understanding of the operation of the physical embodiments described later.

Figure 1:
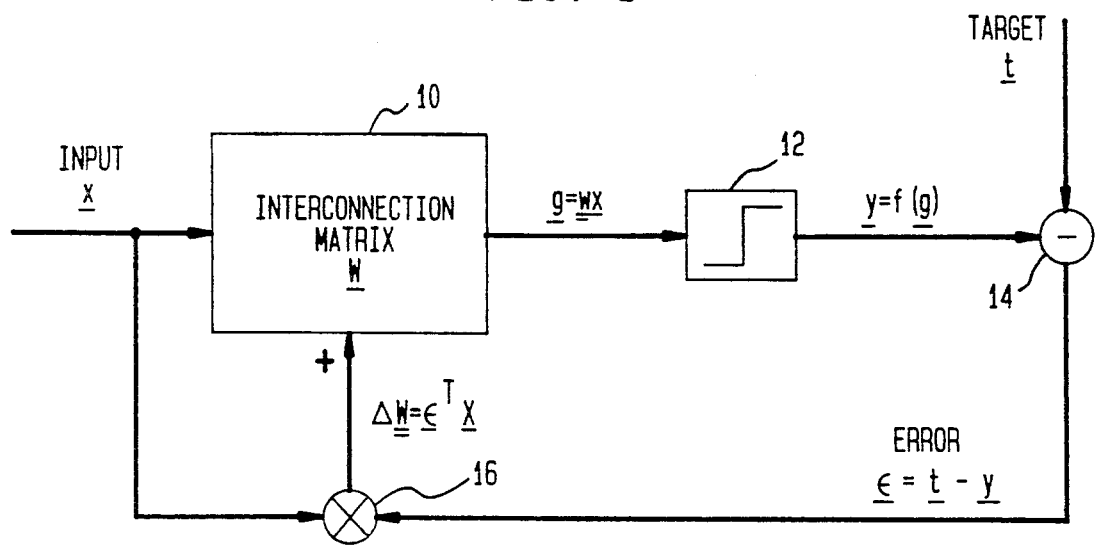
FIG. 1 illustrates the perceptron algorithm used in the invention.

As illustrated in FIG. 1, a training input vector $\bar{x}$ is presented to the system and is multiplied in step 10 with the interconnection matrix $\overleftrightarrow{W}$ to give a weighting vector $\bar{g}$ $$g_i = \sum_{j=1}^{N} W_{ij} x_j \quad (1)$$

The weighting vector $\bar{g}$ is thresholded in step 12 to produce an output vector $\bar{y}$, $$y_i = f\{g_i\}. \quad (2)$$

where $f\{\}$ represents the non-linear activation function. Usually, this function is simply the sgn function having a $-1$ value for negative variables and a unity value for positive variables.

The error vector $\bar{\epsilon}$ is obtained in step 14 as the difference between the output vector $\bar{y}$ and a desired target vector $\bar{t}$, $$\epsilon_i = t_i - y_i. \quad (3)$$

The adjustment $\overleftrightarrow{\Delta W}$ of the interconnection matrix $\overleftrightarrow{W}$ is calculated in step 16 as the outer product of the input $\bar{x}$ and the error vector $\bar{\epsilon}$ multiplied by a learning rate $\eta$, $$\Delta W_{ij} = \eta \epsilon_i x_j. \quad (4)$$

The adjustment $\overleftrightarrow{\Delta W}$ is added to the interconnection matrix $\overleftrightarrow{W}$. The process is repeated with the same or a different set of the training input $\bar{x}$ and target $\bar{t}$ until all training inputs are learned.

Upon completion of learning, an unknown pattern $\bar{x}_u$ is substituted for the training input vector $\bar{x}$ and the resultant output vector $\bar{y}$ (with no feedback) represents a decision on which training input $\bar{x}$ it most closely resembles.

For image recognition, the input vector $\bar{x}$ may represent a two-dimensional image of relatively large size. The output vector $\bar{y}$ may have a length equal to the number of different images to be recognized. In a direct representation, a unity value for an i-th component of $\bar{y}$ would indicate certain recognition of the i-th image. The targets $\bar{t}$ are paired with the training inputs $\bar{x}$ to be learned and, in the direct representation, have a single non-zero component corresponding to their paired training input $\bar{x}$.

FIG. 1 represents only an algorithm. It may be implemented as software, as electronics, or, for the present invention, primarily by means of optical components.

FIG. 2 schematically illustrates an embodiment of the learning machine of the present invention. The learning machine includes a holographic memory utilizing a volume photorefractive crystal 20 of 0.01% iron doped $LiNbO_3$ of dimensions $20 \times 6 \times 20$ mm in the illustrated x, y, and z directions. The c-axis of the crystal 20 is aligned with the illustrated x-direction and becomes the grating direction of the holographic memory 20. The present inventor has described a related type of holographic memory in U.S. Pat. No. 4,988,153. He and others have also described the embodiment of FIG. 2 in "Holographic implementation of a learning machine based on a multicategory perceptron algorithm," *Optics Letters*, volume 14, 1989, pages 1303–1305 and in "Optical learning machine for multi-category classification," *Optics News*, December 1989, page 28.

Images used in training and testing the system are stored in an image memory 20, for example, an optical disk recorder, Panasonic Model TQ-2026F. A computer 24 controls the display of a selected image on a CRT monitor 26, from where it is projected by a lens 28 onto a first side of a spatial light modulator 30. A laser 32, for example, an argon laser, Spectra Physics Model 2020, produces a coherent collimated beam which is reflected by a half-silvered mirror 34 onto a second side of the spatial light modulator 30 opposite the image input. The spatial light modulator 30 has been described by Bleha et al. in "Application of the liquid crystal light valve to real-time optical data processing," *Optical Engineering*, volume 27, 1978, pages 371–384 and is commercially available from Hughes Electronics. The image intensity on its first side modulates the reflectivity on its opposite side. Thereby, the spatial light modulator 30 converts the incoherent image on the monitor 26 to a coherent image of reflected laser light. This coherent image beam is partially transmitted through the mirror 34. A lens 35 having a focal length of 40 cm focuses the coherent image onto the photorefractive crystal 20.

Disregarding for the moment the reference beam, the coherent image beam causes a beam to be diffracted at some angle from the photorefractive crystal 20. This diffracted beam is focused by a lens 36 onto a linear detector array 38. The array 38 extends along the grating direction of the photorefractive crystal 20, the x-direction. To provide additional sensitivity a cylindrical lens 40 concentrates the light in the line of the array 38. The detector array 38 was a Centronics Model LD2-5A having 20 detector elements on 0.9 mm center-to-center spacings.

The elements of the detector array 38 are paired. For reasons that should become clear later, the outputs of a pair correspond to positive and negative signals although both are electronically of the same polarity. Electrical outputs of each pair of detector elements are connected to inputs of a respective recognition circuit 40, in which the inputs are subtracted and thresholded.

The outputs $y_1$ through $y_N$ of the circuits 40 represent the output signals of Equation (2). In this simple embodiment, the sgn threshold means that $y_i=1$ when the positive input is larger than the negative input, and $y_i=0$ otherwise. These output signals are both stored in the computer 24 and received by a respective error circuit 42. The error circuits 42 receive from the computer 24 respective components of the target vector $\bar{t}_i$ corresponding to the image $\bar{x}_i$ present on the monitor 26. They difference the target signals and the output signals $\bar{y}$ to achieve the error signal of Equation (3). However, to achieve a bipolar signal with unipolar light modulators, the i-th error circuit 42 produces a fixed-magnitude positive-error signal $\epsilon_i^+$ when $y_i<t_i$ and a negative-error signal $\epsilon_i^-$ of the same sign and magnitude when $y_i>t_i$. Otherwise, these error signals are zero. Their difference gives the error component $$\epsilon_i = \epsilon_i^+ - \epsilon_i^- \qquad (5)$$

of the perceptron algorithm.

Figure 3:
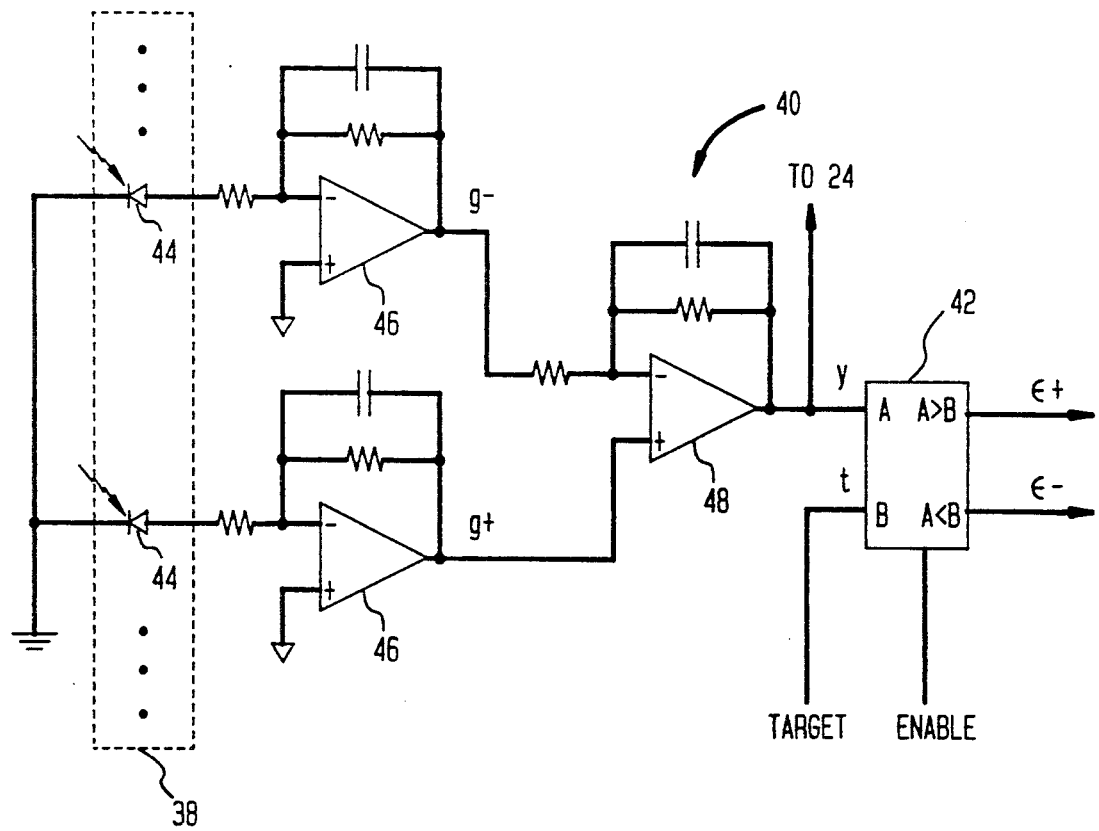
FIG. 3 is a circuit schematic of several of the elements of FIG. 2.

An implementation for the recognition and error circuits 40 and 42 is shown in the circuit diagram of FIG. 3. A pair of photo-detector elements 44 in the detector array 38 have their respective outputs amplified by amplifiers 46, such as an LM324. The feedback resistance and capacitance may be chosen as 1 MΩ and 0.01 μF so as to bring the photo-signals up to digital levels. These amplified signals are compared in the recognition circuit 40, consisting of a digital comparator 48, such as an LM324, and feedback resistor and capacitor. The output of the recognition circuit 40 is a binary output y, that is, either 0 or 1.

The error circuit 42 is based on a magnitude comparator, such as an SN74LS85, which receives the binary output y on its A input and the binary target t on its B input. It outputs a high level $\epsilon^+$ signal when $A>B$ and a high level $\epsilon^-$ when $A<B$. No high-level signal is output when $A=B$. The truth table for the error circuit 42 is given in TABLE 1. The error circuit 42 also has an enable input. When disabled after completion of learning, the error circuit 42 produces all low-level outputs.

TABLE 1

| Output y | Target t | $\epsilon^+$ | $\epsilon^-$ | Error $\epsilon$ |
| --- | --- | --- | --- | --- |
| 0 | 0 | 0 | 0 | 0 |
| 0 | 1 | 1 | 0 | +1 |
| 1 | 0 | 0 | 1 | −1 |
| 1 | 1 | 0 | 0 | 0 |

With reference again to FIG. 2, the 2N error signals $\epsilon_i^+$ and $\epsilon_i^-$ are connected to respective elements of a linear liquid-crystal modulator array 50. The modulator array 50 modulates a wide beam from the laser 32. The two illustrated lasers 32 are a single laser producing, by unillustrated mirrors and a beam splitter, two coherent, phase-locked beams. The laser beam traversing the modulator array 50 is directed at the photorefractive crystal 20 at an angle of 23° from the laser beam modulated by the spatial light modulator 30.

The modulator array 50 had 20 elements, which were arranged along the grating direction, the x-direction, and were 0.45 mm wide separated from neighboring elements by 0.45 mm to match the detector array 40. The binary signals $\epsilon_i^+$ and $\epsilon_i^-$ applied to the elements made them selectively transmitting and blocking.

The modulator array 50 was an amplitude modulator specially fabricated from a twisted nematic liquid crystal generally following the procedure described by Schadt et al. in "Voltage-Dependent Optical Activity of a Twisted Nematic Liquid Crystal," *Applied Physics Letters*, volume 18, 1971, pages 127–128. It comprised a sandwich structure having a polarizer and crossed analyzer separated by 10 μm of 90° twisted nematic liquid crystal. For both the polarizer and analyzer, a linearly polarizing medium was applied to one side of a glass substrate, and an electrode and alignment layer were applied to the other side. The alignment layer was rubbed in the polarization direction of the polarizing medium. The electrode was defined in the pattern described above for the polarizer while it was left undefined as a common electrode for the analyzer. When the analyzer and polarizer were assembled with the liquid crystal therebetween, their polarization directions were set at right angles. The modulator element defined by the patterned electrode was bright or transmitting when no electric field was applied across the liquid crystal (V=0) while it was dark when a voltage of 5 V was applied across the 10 μm of liquid crystal.

Whatever laser light is transmitted by the modulator array 50 is focused by a lens 52 of 26-cm focal length onto the photorefractive crystal 20. A cylindrical lens 54 increases the light sensitivity. Unillustrated polarizers disposed in the beams from the spatial light modulator 30 and from the liquid-crystal modulator 50 pass only the polarization vectors oriented along the y-direction to reduce the scattering effect of nonlinear beam coupling.

The light transmitted through the modulator array 50 coherently interferes with the image light from the spatial light modulator 30 to reconfigure the information recorded on the photorefractive crystal 20. Disregarding the error-feedback learning, the 2N beams from the modulator array 50 act as 2N reference beams for recording the image from the monitor 26 as one or more of 2N images in the photorefractive crystal 20. In the absence of an image signal, the recorded images can be read out by selecting one of the elements in the modulator array 50. The recorded grating pattern causes the light to diffract as a reconstructed image beam, which is focused by a lens 56 onto a focal plane array 58 of a TV camera. The reconstructed images can thus be viewed and, if desired, later reloaded for evaluation of the holographic recording.

The 2N images stored in the photorefractive crystal 20 are used for a bipolar representation of N neurons or classifiable categories. The positive or negative value of the weight matrix $W_{ij}^\pm$ is recorded by interfering the training input image $x_i$ with the error signal from the $j^\pm$-th element of the modulator array 50. During error feedback, the weighting output from the $i^\pm$-th detector in the detector array 38 is $$|g_i^\pm|^2 = \left| \sum_j W_{ij}^\pm x_j \right|^2. \qquad (6)$$

The operation of the signal circuits 40 generates outputs as follows:

if $|g_i^+|^2 > |g_i^-|^2$, then $y_i=1$;

if $|g_i^+|^2 \leq |g_i^-|^2$, then $y_i=0$. $\qquad (7)$

Figure 4:
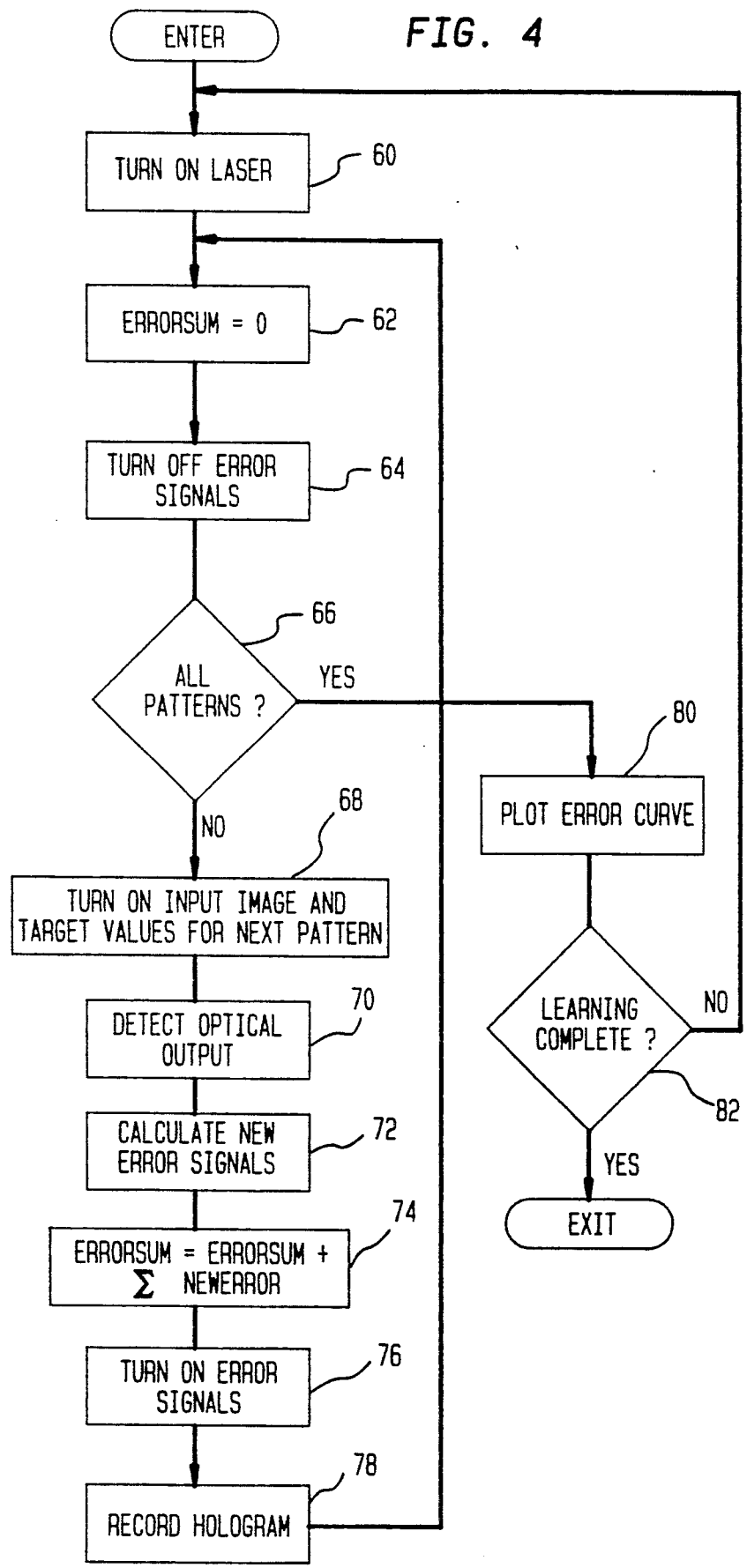
FIG. 4 is a flow chart of the learning procedure of the apparatus of FIG. 2.
Figure 5:
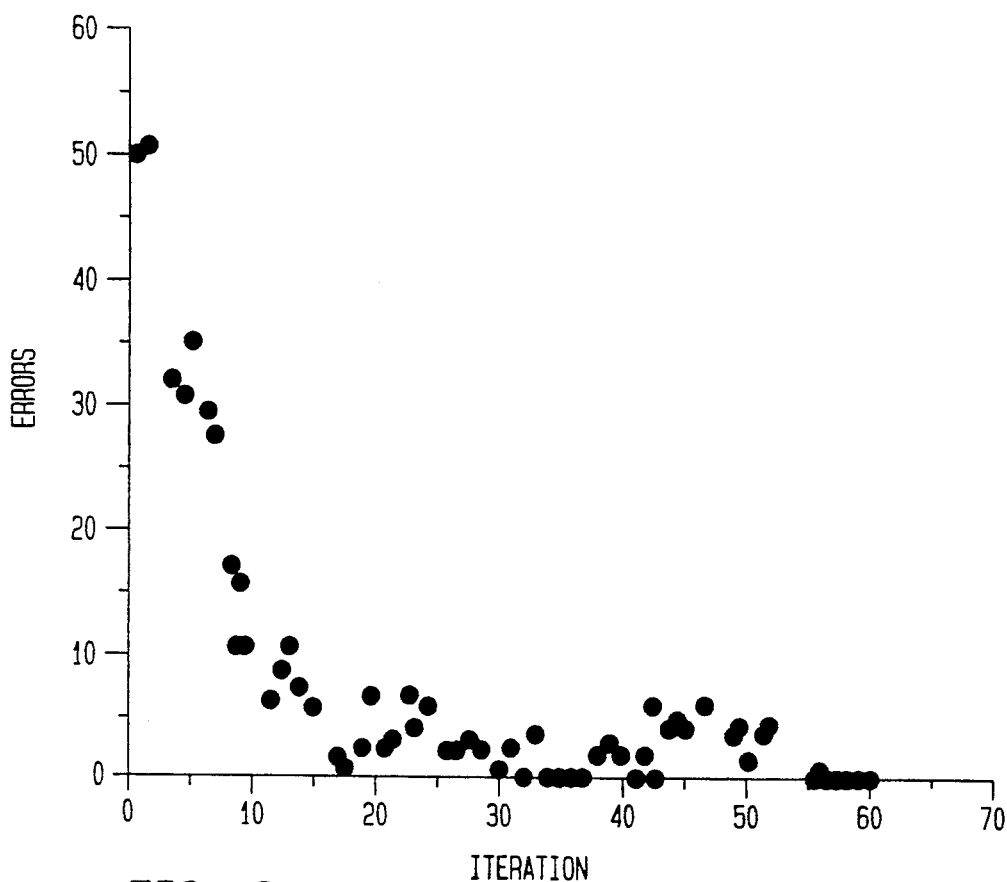
FIG. 5 is a learning curve in an exemplary use of the apparatus of FIG. 2.

The operation of the learning machine of FIG. 2 is illustrated by the flow chart of FIG. 4. Upon the beginning of learning, the laser 32 is turned on for the entire learning procedure. Then, in the first step of a learning iteration, the error value ERRORSUM is set to zero in step 62. In the first step 64 of the learning cycle for a particular pattern, all the error signals $\epsilon_i^+$ and $\epsilon_i^-$ are turned off by disabling the error circuits 42 so that no laser light passes the modulator array 50. Test 66 determines if all the learning patterns have been processed for this learning iteration. If not, in step 68 the computer 24 causes the image for the next pattern to be displayed on the monitor 26 and outputs the target values $t_i$ associated with that pattern.

In step 70, the detector array 38 detects the optical intensities of the 2N beams from the photorefractive crystal 20 and outputs the corresponding 2N unthresholded weighting outputs. In step 72, the recognition circuits 40 and the error circuits 42 calculate the 2N new error signals $\epsilon_i^\pm$. The computer 24 performs a similar calculation to produce corresponding values NEWERROR. In step 74, the computer adds the 2N values of NEWERROR to the error value ERRORSUM. In step 76, the error signals $\epsilon_i^\pm$ are turned on by enabling the error circuit 42. A wait state for a set period in step 78 causes the hologram to be recorded in the photorefractive crystal 20. The set period depends upon the intensity of the laser 32 and the recording sensitivity of the photorefractive crystal 20. After the corrections have been recorded, the learning cycle repeats for the next pattern.

If test 66 determines that all the patterns have been taught in the current learning iteration, then in step 80 the current value of ERRORSUM is used to plot the error curve, which is the plot of ERRORSUM against the learning iteration number. Test 82 determines whether learning is complete. We used the criterion that ERRORSUM must equal zero for ten consecutive learning iterations. The requirement for consecutive zero values of the error is based on the observation of its oscillatory behavior as it approaches zero. If learning is not complete, another learning iteration is executed. Otherwise, the procedure is exited.

The photorefractive crystal 20 could saturate with excessive iterations of the training, thus preventing further modification of the interconnection strengths. However, the saturation is countered by the finite decay time of the crystal 20. Therefore, the optical gain should be reduced to the point that saturation never occurs.

The learning system was demonstrated in which 24 images were learned, specifically, three related sets of 8 images apiece. One set were the 8 standard capital letters I, J, K, L, M, N, O, and P. A second set were rotated versions of the first set. A third set were elongated or compressed versions of the first set. These patterns have many segments in common and thus offer a challenging trial. The system was trained to classify the training inputs into one of eight output states. Each training pattern was exposed for 7 sec at the optical power level of 18.5 mW/cm$^2$ on the crystal 20, which should be compared with a saturation level of approximately 45 J/cm$^2$. The 24 patterns were taught by sequentially exposing each pattern and iterating this sequence. The learning curve is shown in FIG. 4, which plots the error rate as a function of the iteration. The number of errors per iteration was based on the total number of non-congruences between the components of the output vector and the components of the target vector, $y_i \neq t_i$, summed over the iteration. Thus, there were 8×24=196 possible errors per iteration. After 50 iterations, there were no further errors.

Once the system has been taught, the photorefractive crystal 20 should be fixed with the recorded information, preferably while the system continues to be taught. After fixing, unknown images can be presented on the CRT display 26. The fixing process has been disclosed by Amodei et al. in "Improved Electrooptic Materials and Fixing Techniques for Holographic Recording," *Applied Optics*, volume 11, 1972, pages 390–396 and by Micheron et al. in "Electrical Control in Photoferroelectric Materials for Optical Storage," *Applied Optics*, volume 13, 1974, pages 784–787. Alternatively to the fixing, the unknown images can be presented to the photorefractive crystal 20 in the interval between completion of learning and the decay of the recorded information. After the information has decayed, learning is repeated.

When the system is being used as a recognizer of unknown inputs presented to it on the CRT screen 26, the error circuits 42 are disabled to prevent feedback. In error free operation, the computer 24 detects which of the output signals $y_i$ has a non-zero value and the image is thus determined to be the i-th image.

An advantage of the invention is that it provides bipolar weighting outputs $g_i$. The polarity of $g_i$ is all that is needed for either decision on a recognition class or correcting for an erroneous decision during training. Bipolar outputs are required for an exact implementation of the perceptron algorithm and thus allow for efficient learning. In contrast, the known prior-art optical learning machines detected only the optical power proportional to $|g|^2$, thereby losing the polarity of g. The optical power thus needed to be compared to a threshold, which needs to be separately determined, reducing the learning efficiency. The lower power levels of the invention allow operation at lower exposure levels, thereby avoiding the saturation level of the photorefractive material. A photorefractive material decays much more slowly from a low exposure than from its saturated state. Thus the material can be written quickly but retains the recorded information for a long time. This asymmetry in times allows for the training (recording) of a large number of images.

The generic design of the embodiment of FIG. 2 has the advantage that it may be integrated into a rugged, compact device, allowing its commercial use in a non-laboratory environment. As illustrated in the perspective drawing of FIG. 6, the support for the integrated structure is a cube 90 of photorefractive material, e.g., LiNbO$_3$ 20 mm on a side. The laser 32 is a laser diode producing a coherent conical beam of visible wavelength irradiating the entire front face 92 of the cube 90. The error modulator array 44 having 2N linear LCD elements 96 is bonded to the front face 92 of the cube 90. An image 98, here represented by the letter A, is imposed on a 2-dimensional, transmissive liquid-crystal modulator imaging array 100, driven by an externally supplied electronic image signal. The imaging array 100 is a transmissive liquid-crystal modulator array of the type used in a liquid-crystal television screen. The imaging array 100 is also bonded to the front face 92. A sheet polarizer 102 is positioned between both the error and imaging arrays 44 and 100 and the photorefractive cube 90. If the light from the laser 32 is not polarized, a complementary sheet polarizer is placed on the front of the error and imaging arrays 44 and 100 so as to form the polarizer/analyzer required for the operation of the liquid-crystal arrays 44 and 100. A diffuser 104 is placed between the rear sheet polarizer 102 and the photorefractive cube 90. Controlled roughening of the front face 92 may provide the diffusion effect. The diffuser 104 provides coherent spherical wavefronts in respective error and image beams 108 and 106 from all points on the front face 92 through which light is passed by the error and imaging arrays 44 and 100. The recognition and error circuits 40 and 42 are incorporated into an integrated electronic circuit 110 bonded to a side face 112 of the cube 90. The target values $t_i$ and other control signals are externally supplied to the integrated circuit 104. Electrical lines 114 deposited on the side and front faces 112 and 92 carry the error signals $\epsilon_i^\pm$ to the error array 44.

A lens section 116 is rigidly attached to the rear face of the cube 90. As illustrated in the back perspective view of FIG. 7, a cylindrical lens 118 is embedded in the otherwise transparent lens section 116. The lens 118 may be a standard bulk refractive lens, be ion implanted into the $LiNbO_3$ (so that the cube 90 and lens section 116 are integral), or be formed of a linear zone plate, e.g., Fresnel lens, formed at the interface between the cube 90 and the lens section 116. The lens 118 should focus the image 98 on the imaging array 100 into imaging beam 120 and onto the linear detector array 38 bonded to the back of the lens section 116. For example, if the depth of the cube 90 is 20 mm and the thickness of the lens section 116 is 5 mm, a thin zone-plate lens should have a focal length of 4 mm, taking into account any differences in refractive index, in order to satisfy the lens equation. Electrical lines 122 deposited on the surfaces of the lens section 116 and the cube 90 carry the 2N detected intensities to the integrated circuit 110.

Figure 6:
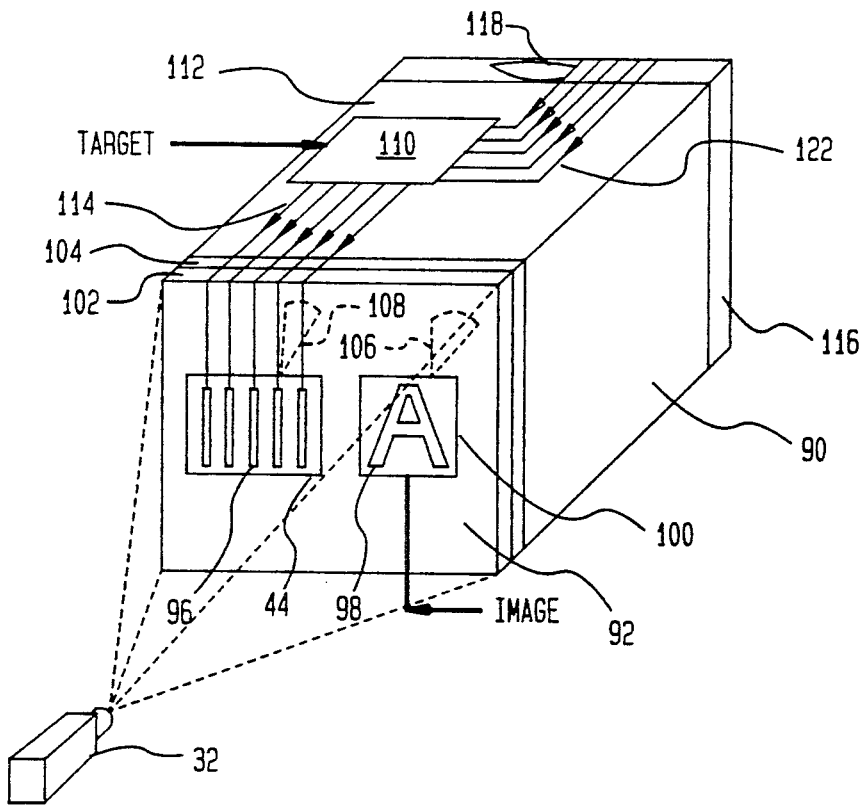
FIGS. 6 and 7 are perspective views of a second embodiment of the invention, in which the elements are integrated.
Figure 7:
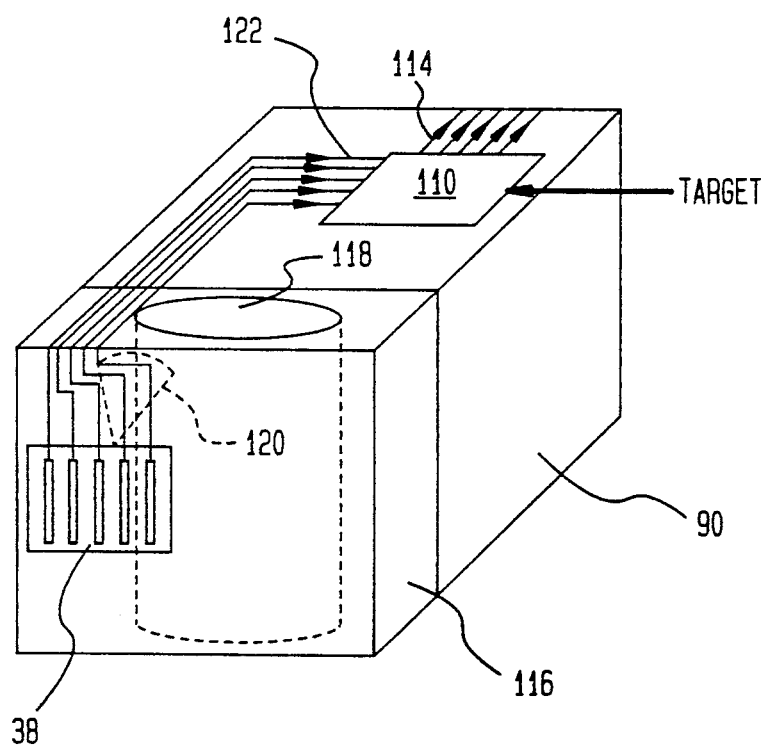

Paek et al have disclosed the embodiment of FIGS. 6 and 7 in "Holographic On-Line Learning Machine for Multicategory Classification," *Japanese Journal of Applied Physics*, volume 29, 1990, pages L1332–L1334.

The learning machine of FIGS. 6 and 7 is small and rugged and does not demand laboratory conditions in order to maintain its alignment. Either embodiment of the learning machine completely implements the perceptron algorithm. They provide a dense recording of complex images with relatively simple components.

What is claimed is:

1. A holographic learning machine, comprising:
    a holographic recording medium;
    a source of a first beam and a second beam of light coherent with each other;
    a source of a set of training vectors impressed on a spatial extent of said first beam of light;
    a first optical system distributing said first beam through said recording medium;
    an array of 2N detectors, N being greater than 1;
    a second optical system distributing a third beam diffracted by said recording medium from said first beam onto said detectors;
    N processing units, each receiving and combining inputs from at least two of said detectors and a target signal corresponding to a selected one of said set of training vectors and producing a positive-error signal and a negative-error signal, 2N error signals being thereby produced;
    an array of 2N optical modulators simultaneously spatially modulating said second beam and receiving respective ones of said error signals; and
    a third optical system distributing said second beam modulated by said array of modulators onto said recording medium.

2. A holographic learning machine as recited in claim 1, wherein each of said processing units includes:
    a recognition circuit comparing outputs of two of said detectors and thresholding a result of said comparison; and
    an error circuit comparing a result of said thresholding with said target signal.

3. A holographic learning machine as recited in claim 1, wherein each of said first, second, and third optical systems comprises at least one lens.

4. A holographic learning machine as recited in claim 1, wherein each of said first and third optical systems comprises a diffusive medium attached to said recording medium.

5. A holographic learning machine as recited in claim 4, wherein said second optical system comprises a lens attached to said recording medium.

6. A holographic learning machine as recited in claim 5, wherein said array of optical modulators are attached to said recording medium and wherein said array of detectors is attached to a medium surrounding a periphery of said lens of said second optical system.

7. A holographic learning machine as recited in claim 6, wherein said processing units are attached to a surface of said recording medium.

8. A holographic learning machine as recited in claim 1, wherein each of said processing units is an electrical processing unit.

9. A holographic learning machine as recited in claim 1, wherein each of said processing units implements a complete perceptron algorithm acting upon said received inputs and said received target signal and providing said positive-error and negative-error signals.

10. A holographic learning machine as recited in claim 1, wherein said training vectors are 2-dimensional images impressed on an area of said first beam of light.

11. An integrated holographic learning machine, comprising:
    a body of a recordable photorefractive material;
    a two-dimensional selectively transmissive array attached to a face of said body;
    a linear selectively transmissive array attached to said face;
    a lens rigidly attached to said body; and
    a linear detector array rigidly attached to said body with said lens therebetween.

* * * * *